US011600279B2

(12) United States Patent
Chevrier et al.

(10) Patent No.: US 11,600,279 B2
(45) Date of Patent: Mar. 7, 2023

(54) TRANSCRIPTION OF COMMUNICATIONS

(71) Applicant: Sorenson IP Holdings, LLC, Salt Lake City, UT (US)

(72) Inventors: Brian Chevrier, Highland, UT (US); Shane Roylance, Farmington, UT (US); Kenneth Boehme, South Jordan, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 55 days.

(21) Appl. No.: 17/279,512

(22) PCT Filed: Aug. 26, 2019

(86) PCT No.: PCT/US2019/048127
§ 371 (c)(1),
(2) Date: Mar. 24, 2021

(87) PCT Pub. No.: WO2020/076425
PCT Pub. Date: Apr. 16, 2020

(65) Prior Publication Data
US 2021/0398538 A1 Dec. 23, 2021

Related U.S. Application Data

(63) Continuation of application No. 16/154,553, filed on Oct. 8, 2018, now Pat. No. 10,325,597.

(51) Int. Cl.
*G10L 15/04* (2013.01)
*G06F 17/00* (2019.01)
(Continued)

(52) U.S. Cl.
CPC .............. *G10L 15/26* (2013.01); *G10L 15/06* (2013.01); *G10L 15/08* (2013.01); *G10L 15/22* (2013.01);
(Continued)

(58) Field of Classification Search
CPC ......... G10L 15/04; G10L 15/01; G10L 15/08; G10L 15/22
See application file for complete search history.

(56) References Cited

U.S. PATENT DOCUMENTS 6,601,027 B1 7/2003 Wright et al.
9,093,075 B2 7/2015 Alameh et al.
(Continued)

FOREIGN PATENT DOCUMENTS

CN 109243461 A * 1/2019 ........... G10L 15/063
EP 0555545 A1 8/1993
(Continued)

*Primary Examiner* — Shreyans A Patel
(74) *Attorney, Agent, or Firm* — Maschoff Brennan

(57) ABSTRACT

A method to transcribe communications may include obtaining audio data originating at a first device during a communication session between the first device and a second device and providing the audio data to an automated speech recognition system configured to transcribe the audio data. The method may further include obtaining multiple hypothesis transcriptions generated by the automated speech recognition system. Each of the multiple hypothesis transcriptions may include one or more words determined by the automated speech recognition system to be a transcription of a portion of the audio data. The method may further include determining one or more consistent words that are included in two or more of the multiple hypothesis transcriptions and in response to determining the one or more consistent words, providing the one or more consistent words to the second device for presentation of the one or more consistent words by the second device.

19 Claims, 5 Drawing Sheets

(51) Int. Cl.
 *G10L 15/26* (2006.01)
 *G10L 15/08* (2006.01)
 *G10L 15/06* (2013.01)
 *G10L 15/22* (2006.01)

(52) U.S. Cl.
 CPC .. *G10L 2015/088* (2013.01); *G10L 2015/221* (2013.01)

(56) References Cited

U.S. PATENT DOCUMENTS

| | | | |
|---|---|---|---|
| 10,102,851 | B1 | 10/2018 | Kiss et al. |
| 10,325,597 | B1 | 6/2019 | Chevrier et al. |
| 2001/0037200 | A1 | 11/2001 | Ogawa et al. |
| 2009/0018833 | A1 | 1/2009 | Kozat et al. |
| 2009/0228274 | A1 | 9/2009 | Terrell et al. |
| 2009/0248416 | A1 | 10/2009 | Gorin et al. |
| 2010/0323728 | A1 | 12/2010 | Gould et al. |
| 2013/0110492 | A1* | 5/2013 | McGraw ............ G03F 7/70908 704/E15.005 |
| 2013/0144610 | A1 | 6/2013 | Gordon et al. |
| 2014/0207451 | A1 | 7/2014 | Topiwala et al. |
| 2015/0094105 | A1 | 4/2015 | Pan |
| 2015/0095026 | A1 | 4/2015 | Bisani et al. |
| 2015/0199966 | A1 | 7/2015 | Paulik et al. |
| 2016/0062970 | A1 | 3/2016 | Sadkin et al. |
| 2016/0259779 | A1 | 9/2016 | Labsky et al. |
| 2016/0379626 | A1 | 12/2016 | Deisher et al. |
| 2017/0201613 | A1 | 7/2017 | Engelke et al. |
| 2017/0206808 | A1 | 7/2017 | Engelke et al. |
| 2017/0206888 | A1 | 7/2017 | Engelke et al. |
| 2017/0206914 | A1 | 7/2017 | Engelke et al. |
| 2017/0208172 | A1 | 7/2017 | Engelke et al. |
| 2018/0034961 | A1 | 2/2018 | Engelke et al. |
| 2018/0096678 | A1* | 4/2018 | Zhou ....................... G10L 15/22 |
| 2018/0270350 | A1 | 9/2018 | Engelke et al. |
| 2019/0037072 | A1 | 1/2019 | Engelke et al. |

FOREIGN PATENT DOCUMENTS

| | | |
|---|---|---|
| EP | 0645757 A1 | 3/1995 |
| EP | 2587478 A2 | 1/2013 |
| WO | 2014022559 A1 | 2/2014 |
| WO | 2015131028 A1 | 9/2015 |

\* cited by examiner

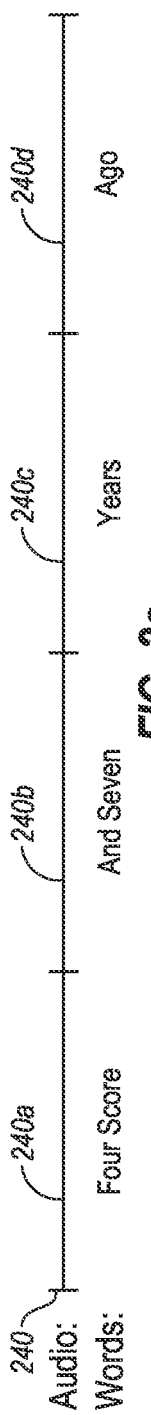
FIG. 2a
```
250a — First Hypothesis:     Four Floor
250b — Second Hypothesis:    Four Score And Heaven
250c — Third Hypothesis:     Four Score And Heaven Years
252  — Final Transcription:  Four Score And Seven Years Ago
```
FIG. 2b
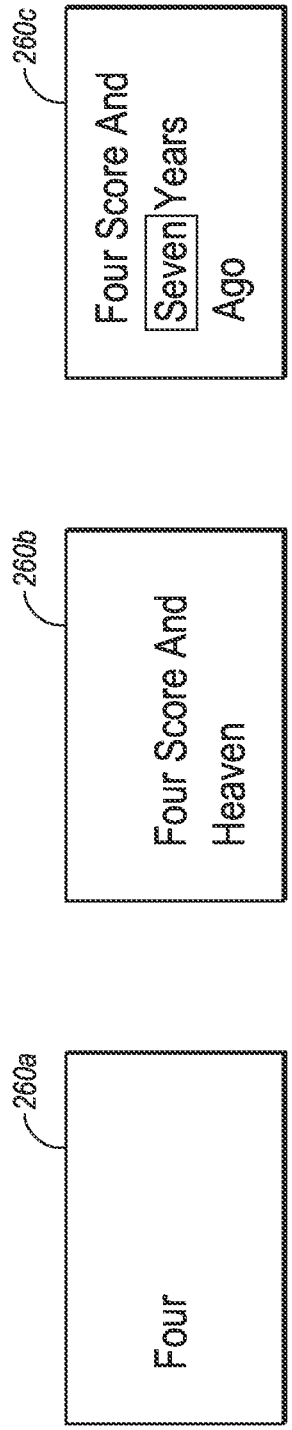
FIG. 2c

TRANSCRIPTION OF COMMUNICATIONS

CROSS-REFERENCE TO RELATED APPLICATIONS

This application claims priority to and benefit of International Patent Application No. PCT/US19/48127, filed Aug. 26, 2019, which itself claims priority to and the benefit of U.S. patent application Ser. No. 16/154,553, filed Oct. 8, 2018, entitled TRANSCRIPTION OF COMMUNICATIONS, which are incorporated herein in its entirety.

FIELD

The embodiments discussed herein are related to transcriptions of communications.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to transcribe communications may include obtaining audio data originating at a first device during a communication session between the first device and a second device and providing the audio data to an automated speech recognition system configured to transcribe the audio data. The method may further include obtaining multiple hypothesis transcriptions generated by the automated speech recognition system. In some embodiments, each of the multiple hypothesis transcriptions may include one or more words determined by the automated speech recognition system to be a transcription of a portion of the audio data. The method may further include determining one or more consistent words that are included in two or more of the multiple hypothesis transcriptions and in response to determining the one or more consistent words, providing the one or more consistent words to the second device for presentation of the one or more consistent words by the second device.

BRIEF DESCRIPTION OF THE DRAWINGS

Example embodiments will be described and explained with additional specificity and detail through the use of the accompanying drawings in which:

FIG. 2a illustrates audio divided into segments;

FIG. 2b illustrates transcriptions of the audio of FIG. 2a;

FIG. 2c illustrates presentations of the transcriptions of the audio of FIG. 2b;

DETAILED DESCRIPTION OF SOME EXAMPLE EMBODIMENTS

Figure 1:
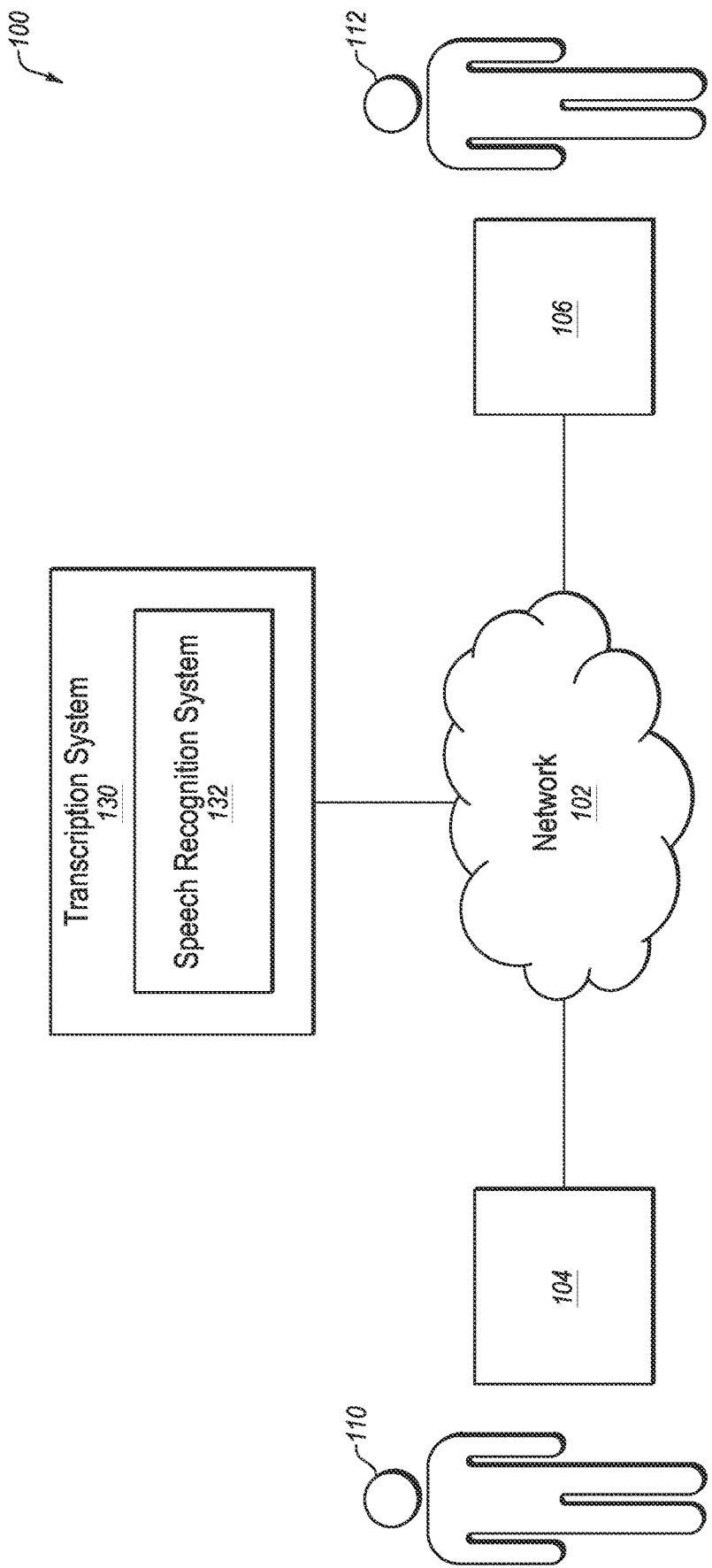
FIG. 1 illustrates an example environment for transcription of communications.

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

In some embodiments, a transcription of audio may be generated by an automatic speech recognition (ASR) system that is part of the transcription system. An ASR system may generate a transcription of audio by determining from the waveforms of the audio phonemes of words in the audio. With the phonemes, the ASR system may use statistical analysis regarding the arrangement of phonemes in words to determine a word in the audio. After determining words from the phonemes, statistical analysis of word arrangements may be used to selected words or correct words that were incorrectly determined using the determined phonemes. As more audio is analyzed and more words and phrases are determined, the ASR system may obtain a better contextual understanding of the words and phrases being transcribed. A better contextual understanding of the words and phrases being transcribed may allow the ASR system to more accurately transcribe the audio.

An example of generating a transcription of audio that may include a spoken phrase of "I see two pairs of jean" is now provided. Note that this phrase sounds the same as "I sea to pears of genes." In this example, the ASR system may determine the first word to be "I" and the second word to be "sea or see," based on the sounds of the words. The ASR system may determine that the second word is "see" instead of "sea" based on the phrase "I see" being statistically more likely than the phrase "I sea." Additionally, the ASR system may not be able to determine if the word is "pairs" or "pears" until after making a preliminary determination regarding the final two words of the phrase as the phrases "I see two pairs" and "I see two pears" may be statistically similar without further context. Thus, an ASR system typically generates more accurate transcriptions when the ASR system analyzes larger portions of audio instead of smaller portions of audio. As a result, when transcribing a live conversation, an ASR system may not output individual phrases, but may output larger portions of the transcription. For example, an ASR system may output an entire sentence or multiple sentences together instead of outputting sentences individually or multiple portions of a sentence sequentially.

As described in this disclosure, hypothesis transcriptions output by an ASR system may be compared. When words are consistent between hypothesis transcriptions, such as the words "I see" in the hypothesis transcriptions of "I see" and "I see two," the consistent words may be provided and presented to the user. As a result, a smaller number of words may be presented at one time to a user and a potential lag between when a word is heard and when the word is displayed may be reduced. A smaller number of words presented at one time and a reduction in a lag between when a word is heard and when the word is displayed may further assist a user in understanding what is said during a communication session.

Thus, the systems and methods described in this disclosure may result in the improved display of transcriptions at a user device. Furthermore, the systems and methods described in this disclosure may improve technology with respect to audio transcriptions and real-time generation and display of audio transcriptions.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 130. The transcription system 130 may include a speech recognition system 132.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user 110. The first audio may include a first voice of the first user 110. The first voice of the first user 110 may be words spoken by the first user. For example, the first device 104 may obtain the first audio from a microphone of the first device 104 or from another device that is communicatively coupled to the first device 104.

The second device 106 may also be configured to obtain second audio from a second user 112. The second audio may include a second voice of the second user 112. The second voice of the second user 112 may be words spoken by the second user. In some embodiments, the second device 106 may obtain the second audio from a microphone of the second device 106 or from another device communicatively coupled to the second device 106. During the communication session, the first device 104 may provide the first audio obtained by the second device 106. Alternatively or additionally, the second device 106 may provide the second audio obtained by the first device 104. Thus, during a communication session, both the first device 104 and the second device 106 may obtain both the first audio from the first user 110 and the second audio from the second user 112.

One or both of the first device 104 and the second device 106 may be configured to provide the first audio, the second audio, or both the first audio and the second audio to the transcription system 130. In some embodiments, the transcription system 130 may be configured to obtain a transcription of the audio received from either one or both of the first device 104 and the second device 106. The transcription system 130 may also provide the transcription of the audio to either one or both of the first device 104 and the second device 106. Either one or both of the first device 104 and the second device 106 may be configured to present the transcription received from the transcription system 130. For example, the first device 104 may be configured to a display the received transcriptions on a display that is part of the first device 104 or that is communicatively coupled to the first device 104.

The transcription system 130 may be configured to obtain a transcription of audio from the speech recognition system 132. In some embodiments, the speech recognition system 132 may include any configuration of hardware, such as processors, servers, and database servers that are networked together and configured to perform a task. For example, the speech recognition system 132 may include one or multiple computing systems, such as multiple servers that each include memory and at least one processor.

The speech recognition system 132 may be configured to generate transcriptions from audio. In some embodiments, the speech recognition system 132 may be an automatic system that automatically recognizes speech independent of human interaction to generate the transcription. In these and other embodiments, the speech recognition system 132 may include speech engines that are trained to recognize speech. The speech engine may be trained for general speech and not specifically trained using speech patterns of the participants in the communication session, e.g., the first user 110 or the second user 112. Alternatively or additionally, the speech engine may be specifically trained using speech patterns of one or both of the participants of the communication session. Alternatively or additionally, the speech recognition system 132 may be a re-voicing system.

In these and other embodiments, the speech recognition system 132 may be configured to recognize speech in the audio. Based on the recognized speech, the speech recognition system 132 may generate a transcription of the speech. The transcription may be a written version of the speech in the audio. In these and other embodiments, the speech recognition system 132 may provide the transcription of the speech to the transcription system 130. The transcription system 130 may provide the transcription of the speech to one or more of the first device 104 and the second device 106.

In some embodiments, the speech recognition system 132 may be configured to receive the audio in real-time or substantially real-time. In these and other embodiments, the speech recognition system 132 may be configured to generate the transcription in real-time or substantially real-time. Thus, as the speech recognition system 132 receives continuous audio, the speech recognition system 132 may be configured to continuously work to generate a transcription. However, the generated transcription may not be synchronized with the audio in that for every period of time audio is received by the speech recognition system 132, the speech recognition system 132 outputs a corresponding transcription that corresponds to the period of time. Rather, the speech recognition system 132 may output transcriptions that correspond to varying periods of time. For example, the speech recognition system 132 may obtain audio continuously during a period that extends from time t1 to time t4, which includes time t2 and time t3 there between. In this example, the speech recognition system 132 may output a transcription for the period from time t1 to time t2 at time t3 and an transcription for the period from time t2 to time t4 at a time after time t4.

In these and other embodiments, the transcription output by the speech recognition system 132 may be a final transcription generated by the speech recognition system 132. The final transcription may be a finalized transcription that is generated by the speech recognition system 132. The speech recognition system 132 may provide the final transcription to the transcription system 130. After the final transcription, the speech recognition system 132 may not further attempt to transcribe the audio corresponding to the final transcription. Thus, after the final transcription is generated, the audio corresponding to the final transcription is not further considered by the speech recognition system 132.

In some embodiments, the speech recognition system 132 may be configured to output one or more hypothesis transcriptions before generating a final transcription for a portion of audio. Thus, a hypothesis transcription corresponding to audio may be generated and output by the speech recognition system 132 while the speech recognition system 132 is transcribing the audio. Thus, after a hypothesis transcription is generated, the audio corresponding to the hypothesis transcription will be further considered by the speech recognition system 132 to generate the final transcription. In these and other embodiments, the speech recognition system 132 may be configured to provide the hypothesis transcriptions to the transcription system 130.

In general, hypothesis transcriptions are preliminary guesses of the speech recognition system 132 as the speech recognition system 132 determines a final transcription. Thus, hypothesis transcriptions may include one or more words that the speech recognition system 132 has currently determined to be a transcription of audio or a portion of the audio corresponding to the final transcription. As a result, a final transcription and hypothesis transcriptions that correspond to the same audio may be associated.

For example, the speech recognition system 132 may obtain audio continuously during a period that extends from time t1 to time t4, which includes time t2 and time t3 there between. The speech recognition system 132 may output a final transcription for the period from time t1 to time t2. The speech recognition system 132 may also output a different hypothesis transcription at each of time t1.2, time t1.3, time t1.6, and time t1.8, which are between time t1 and time t2. The different hypothesis transcriptions may be associated with the final transcription for the audio during the period from time t1 to t2. The number and timing of hypothesis transcriptions output by the speech recognition system 132 for a given portion of audio may vary based on the speech being recognized in the given audio.

Because a final transcription and the hypothesis transcriptions associated with the final transcription may be transcriptions of the same audio, the hypothesis transcriptions may include word, sub-phrases, and/or phrases that may be included in the final transcription. Alternatively or additionally, the hypothesis transcriptions may include some words, sub-phrases, and/or phrases that may not be included in the final transcription based on errors made by the speech recognition system 132 when generating the hypothesis transcriptions. For example, as described early, for the final transcription of "I see two pairs of jeans," the associated hypothesis transcriptions may include "I see," "I see two," and "I see two pears."

In some embodiments, hypothesis transcriptions associated with a final transcription may include any type of character used in written text. In these and other embodiments, hypothesis transcriptions associated with a final transcription may vary in character length. In some embodiments, subsequent hypothesis transcriptions of a final transcription may include more characters than previous hypothesis transcriptions. For example, a first hypothesis transcription that is generated before a second hypothesis transcription may include fewer characters than the second hypothesis transcription. Alternatively or additionally, the first hypothesis transcription may include fewer words than the second hypothesis transcription.

In some embodiments, hypothesis transcriptions associated with a final transcription of audio may be associated with different portions of the audio. For example, a first hypothesis transcription that is output before a second hypothesis transcription may be associated with a first portion of the audio. The second hypothesis transcription may be associated with a second portion of the audio. In these and other embodiments, the second portion of the audio may include the first portion of the audio. For example, the first portion of the audio may include audio from time t1 to time t2. The second portion of the audio may include audio from time t1 to time t3. In this example, time t3 may be after time t2.

The transcription system 130 may be configured to receive hypothesis transcriptions and final transcriptions of audio of the communication session from the speech recognition system 132. The transcription system 130 may use the hypothesis transcriptions and the final transcriptions to provide one or more words to either one or both of the first device 104 and the second device 106 that may be presented as the transcription of the audio of the communication session.

In some embodiments, the one or more words provided by the transcription system 130 may be determined based on the hypothesis transcriptions and final transcriptions received from the speech recognition system 132. In these and other embodiments, the transcription system 130 may receive multiple sets of hypothesis transcriptions and final transcriptions associated with the sets of hypothesis transcriptions. For example, the transcription system 130 may receive a first final transcription and associated first hypothesis transcriptions as a first set of transcriptions and a second final transcription and associated second hypothesis transcriptions as a second set of transcriptions. The second set of transcriptions may corresponding to a second portion of audio and may be received after the first set of transcriptions, which may correspond to a first portion of the audio. The transcription system 130 may determine the one or more words to provide for the first portion of the audio based on the first set of transcriptions. Alternatively or additionally, the transcription system 130 may determine the one or more words to provide for the second portion of the audio based on the second set of transcriptions.

In some embodiments, for each set of transcriptions, the transcription system 130 may be configured to analyze the set of transcriptions to determine the one or more words to provide based on the hypothesis transcriptions and the final transcription. In these and other embodiments, for each set of transcriptions the transcription system 130 may receive one or more hypothesis transcriptions before the associated final transcription. In these and other embodiments, before the final transcription is received by the transcription system 130, the transcription system 130 may be configured to analyze the hypothesis transcriptions to determine the one or more words to provide based on the hypothesis transcriptions.

In some embodiments, the transcription system 130 may analyze the hypothesis transcriptions of a set of transcriptions to determine one or more consistent words that are included in two or more of the hypothesis transcriptions. For example, the transcription system 130 may obtain a first hypothesis transcription and a second hypothesis transcription. The transcription system 130 may compare the first hypothesis transcription and the second hypothesis transcription. Words that are consistent between the first hypothesis transcription and the second hypothesis transcription may be provided by the transcription system 130. In these and other embodiments, words that are consistent between hypothesis transcriptions may be words that are the same in both the hypothesis transcriptions. Alternatively or additionally, words that are consistent between hypothesis transcriptions may be words that are the same and arranged in the same order between the hypothesis transcriptions. In some embodiments, characters as well as words that are consistent between hypothesis transcriptions may be provided. The characters may include punctuation and numbers, among other characters.

In some embodiments, the transcription system 130 for a set of transcriptions may be configured to compare the most recently received hypothesis transcription with the directly subsequent hypothesis transcription to determine the consistent words. Alternatively or additionally, the transcription system 130 may be configured to compare a subset of the hypothesis transcriptions or all of the hypothesis transcriptions of a set of transcriptions to determine the consistent words.

In some embodiments, the transcription system 130 may be configured to receive and compare the hypothesis transcriptions, determine the consistent words, and provide the consistent words to either one or both of the first device 104 and the second device 106 before a final transcription associated with the hypothesis transcriptions is obtained by the transcription system 130. In these and other embodiments, the first device 104 and the second device 106 may be configured to present the consistent words before the final transcription is obtained by the transcription system 130. Alternatively or additionally, the transcription system 130 may be configured to provide the consistent words to either one or both of the first device 104 and the second device 106 before a final transcription associated with the hypothesis transcriptions is provided by the transcription system 130.

In some embodiments, the transcription system 130 may not provide the hypothesis transcriptions to either one or both of the first device 104 and the second device 106. Rather, the transcription system 130 may be configured to determine and provide the consistent words determined based on the hypothesis transcriptions to either one or both of the first device 104 and the second device 106.

In some embodiments, in response to receiving the final transcription, the transcription system 130 may be configured to compare the final transcription with consistent words provided to either one or both of the first device 104 and the second device 106. In comparing the final transcription and the consistent words, the transcription system 130 may determine differences between the final transcription and the provided consistent words. The transcription system 130 may provide the final transcription and the determined differences to either one or both of the first device 104 and the second device 106. The receiving device, such as either one or both of the first device 104 and the second device 106, may present the final transcription and an indication of the determined differences between the final transcription and the consistent words.

After providing a final transcription of a set of transcriptions, the transcription system 130 may not further consider the final transcription and the hypothesis transcriptions associated with the final transcription in the set of transcriptions. In these and other embodiments, the transcription system 130 may proceed to analysis the next set of transcriptions including the hypothesis transcriptions in the next set of transcriptions as previously described. By analyzing the hypothesis transcriptions to determine consistent words and providing the consistent words before a final transcription is received, a lag time between presentation of transcription and presentation of audio at the first and second devices 104 and 106 may be reduced.

Modifications, additions, or omissions may be made to the environment 100 and/or the components operating in the environment 100 without departing from the scope of the present disclosure. For example, in some embodiments, the speech recognition system 132 may not be included in the transcription system 130. In these and other embodiments, the speech recognition system 132 may be coupled to the transcription system 130 over the network 102. Alternatively or additionally, the speech recognition system 132 may be coupled to either one or both of the first device 104 and the second device 106 over the network 102 and either one or both of the first device 104 and the second device 106 may provide the sets of transcriptions to the transcription system 130. Alternatively or additionally, the speech recognition system 132 may be included in either one or both of the first device 104 and the second device 106.

In some embodiments, the transcription system 130 may be included in either one or both of the first device 104 and the second device 106. In these and other embodiments, either one or both of the first device 104 and the second device 106 may be coupled to or include the speech recognition system 132. In these and other embodiments, either one or both of the first device 104 and the second device 106 may be configured to perform the operations of the transcription system 130 as described in this disclosure.

As another example, in some embodiments, the environment 100 may include additional devices similar to the first and second devices 104 and 106. In these and other embodiments, the similar devices may be configured to present communications as described in this disclosure.

FIGS. 2a, 2b, and 2c illustrate an example method to generate transcriptions for presentation as discussed in this disclosure. For example, FIG. 2a illustrates example audio 240 accordingly to some embodiments in the disclosure. The audio 240 may be an example of audio that may be provided by a first device, such as the first device 104 of FIG. 1 and received by a transcription system, such as the transcription system 130 of FIG. 1. The audio 240 may be represented as divided into segments, including a first segment 240a, a second segment 240b, a third segment 240c, and a fourth segment 240d for ease of explanation. The segmentation of the audio 240 may or may not occur in the system and methods described in this disclosure. For example, the audio 240 may be a continuous stream that is part of a communication session.

The segments of the audio 240 may include different words in audible form. For example, the first segment 240a may include the words "four score." The second segment 240b may include the words "and seven." The third segment 240c may include the words "years" and the fourth segment 240d may include the words "ago." The segments may be received in an order from left to right as illustrated in FIG. 2a. In response to receiving the audio 240, a transcription system or other device may provide the audio 240 to a speech recognition system, such as the speech recognition system 132 of FIG. 1. The audio 240 may be provided as the audio is received such that the speech recognition system receives the first segment 240a before the other segments of the audio. In response to receiving the audio 240, the speech recognition system may generate hypothesis transcriptions of the audio 240 and a final transcription of the audio 240.

FIG. 2b illustrates example transcriptions of the audio 240 of FIG. 2a, according to some embodiments of the disclosure. In particular, FIG. 2b illustrates a first hypothesis transcription 250a, a second hypothesis transcription 250b, a third hypothesis transcription 250c, referred to as the hypothesis transcriptions 250, and a final transcription 252. The first hypothesis transcription 250a may represent a hypothesis transcription of the first segment 240a. The second hypothesis transcription 250b may represent a hypothesis transcription of the first segment 240a and the second segment 240b. The third hypothesis transcription 250c may represent a hypothesis transcription of the first segment 240a, the second segment 240b, and the third segment 240c. The final transcription 252 may represent a transcription of the audio 240.

The first hypothesis transcription 250a may be generated by a speech recognition system after the speech recognition system receives the first segment 240a. In some embodiments, the first hypothesis transcription 250a may be generated by the speech recognition system before receiving all of the audio 240. As illustrated, the first hypothesis transcription 250a may not be an accurate transcription of the first segment 240a.

The second hypothesis transcription 250b may be generated by the speech recognition system after the speech recognition system receives the second segment 240b. In some embodiments, the second hypothesis transcription 250b may be generated by the speech recognition system before receiving all of the audio 240. As illustrated, the second hypothesis transcription 250b may correct an error in the first hypothesis transcription 250a but may also include an error. After generation of the first hypothesis transcription 250a and the second hypothesis transcription 250b, a transcription system, such as the transcription system 130 of FIG. 1, may determine words consistent between the first hypothesis transcription 250a and the second hypothesis transcription 250b. The consistent word between the first hypothesis transcription 250a and the second hypothesis transcription 250b may be the word "four" and is bolded in FIG. 2b to illustrate the word is consistent.

The third hypothesis transcription 250c may be generated by the speech recognition system after the speech recognition system receives the third segment 240c. In some embodiments, the third hypothesis transcription 250c may be generated by the speech recognition system before receiving all of the audio 240. As illustrated, the third hypothesis transcription 250c may not correct an error in the second hypothesis transcription 250b. After generation of the third segment 240c, the transcription system may determine consistent words between the second hypothesis transcription 250b and the third hypothesis transcription 250c. The consistent words between the second hypothesis transcription 250b and the third hypothesis transcription 250c may be the words "four score and heaven," which are bolded to illustrate the words are consistent.

The final transcription 252 may be generated by the speech recognition system after the speech recognition system receives the audio 240. As illustrated, the final transcription 252 may correct the error in the third hypothesis transcription 250c. After generation of the final transcription 252, the transcription system may determine words that are different between the final transcription 252 and the consistent words determined based on the second hypothesis transcription 250b and the third hypothesis transcription 250c. In this embodiment, the word "heaven" may be determined to be different. The word determined to be different may be a word that is an error in the third hypothesis transcription 250c.

FIG. 2c illustrates presentations 260 of the transcriptions of the audio 240 of FIG. 2b, according to some embodiments of the disclosure. The presentations 260 may include a first presentation 260a, a second presentation 260b, and a third presentation 260c. The presentations 260 may illustrate how a device, such as one of the first device 104 or the second device 106 of FIG. 1, may present consistent words on a display from a transcription system.

In some embodiments, the first presentation 260a may display the consistent word determined using the first hypothesis transcription 250a and the second hypothesis transcription 250b. In some embodiments, the first presentation 260a may occur before the generation of the final transcription 252.

In some embodiments, the second presentation 260b may display the consistent word determined using the second hypothesis transcription 250b and the third hypothesis transcription 250c. The second presentation 260b may occur after the first presentation 260a. Thus, the word "four" may be presented. Following the presentation of the word "four," the additional words of "score and heaven," may be presented. The words may be presented in rolling fashion such that all of the words to be presented may be presented in less than a threshold period of time. The threshold period of time may be based on a display screen size, an average reading speed of a user, and an average talking speed of a user, among other factors. For example, the threshold period of time may be 0.5, 1.0, 1.5, 2.0, or 3.0 seconds, or some other threshold period of time.

Because the words may be presented in a rolling fashion, when more words are to be presented, the words may be presented quicker than when fewer words are to be presented. Furthermore, as additional words are presented, the current words may scroll up a display to allow the additional words to be added at a bottom of the display as illustrated by the word placement between the second presentation 260b and the third presentation 260c.

In some embodiments, the third presentation 260c may occur after the second presentation 260b and may display the words of the final transcription 252. In addition, the third presentation 260c may provide an indicator of the words previously presented and have changed with the presentation of the final transcription 252. For example, as illustrated, the word "seven" has a box drawn there around to illustrate that the word "seven" was not previously presented and is a correction of the previous presented word "heaven." The box around the word "seven" is merely an example of one indicator that may be used to identify a change in previously presented words. Other indicators may be used including font color, font type, font size, shading, background color, and other shapes drawn around the changing words, among other identifiers. Modifications, additions, or omissions may be made to the example method illustrated in FIGS. 2a, 2b, and 2c, without departing from the scope of the present disclosure.

Figure 3:
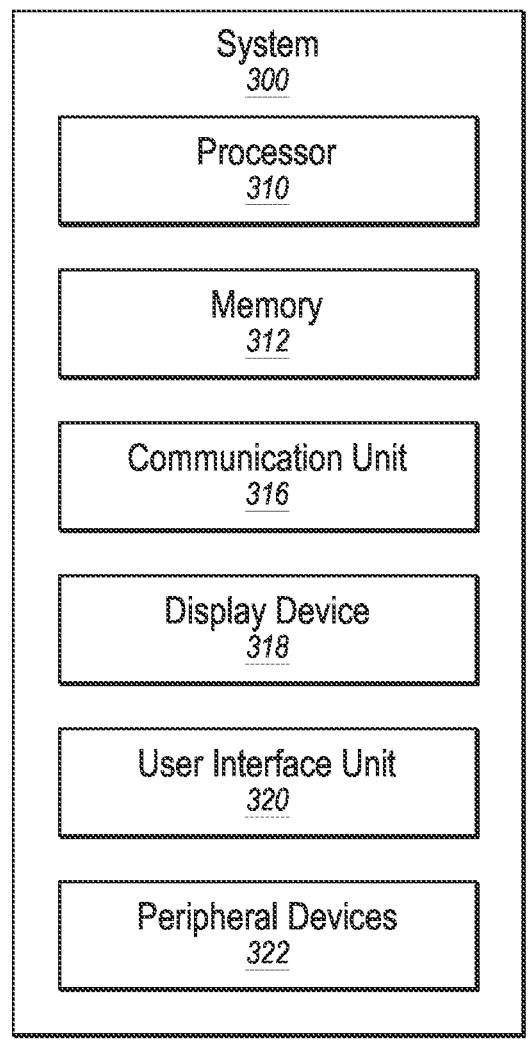
FIG. 3 illustrates an example system that may be used during transcription of communications.

FIG. 3 illustrates an example system 300 that may be used in the performance of gain operations described herein. The system 300 may include a processor 310, memory 312, a communication unit 316, a display device 318, a user interface unit 320, and a peripheral device 322, which all may be communicatively coupled. In some embodiments, the system 300 may be part of any of the systems or devices described in this disclosure.

For example, the system 300 may be part of the first device 104 of FIG. 1 and may be configured to perform one or more of the tasks described above with respect to the first device 104. As another example, the system 300 may be part of the second device 106 of FIG. 1 and may be configured to perform one or more of the tasks described above with respect to the second device 106. As another example, the system 300 may be part of the transcription system 130 of FIG. 1 and may be configured to perform one or more of the tasks described above with respect to the transcription system 130.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to gain operations such that the system 300 may perform or direct the performance of the operations associated therewith as directed by the instructions. In these and other embodiments, the instructions may be used to perform one or more operations described above with respect to the transcription system 130 of FIG. 1, and/or one or more of the operations of the methods 400 and 500 of FIGS. 4 and 5, respectively.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), a telephone jack, and/or the like. The communication unit 316 may permit data to be exchanged with a network and/or any other devices or systems described in the present disclosure.

The display device 318 may be configured as one or more displays that present images, words, etc., like an LCD, LED, projector, or other type of display. The display device 318 may be configured to present video, text captions, user interfaces, and other data as directed by the processor 310. For example, when the system 300 is included in the second device 106 of FIG. 1, the display device 318 may be configured to present transcriptions.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display device 318 may be combined.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may present audio received by the system 300 or otherwise generated by the system 300 by broadcasting the audio.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

Figure 4:
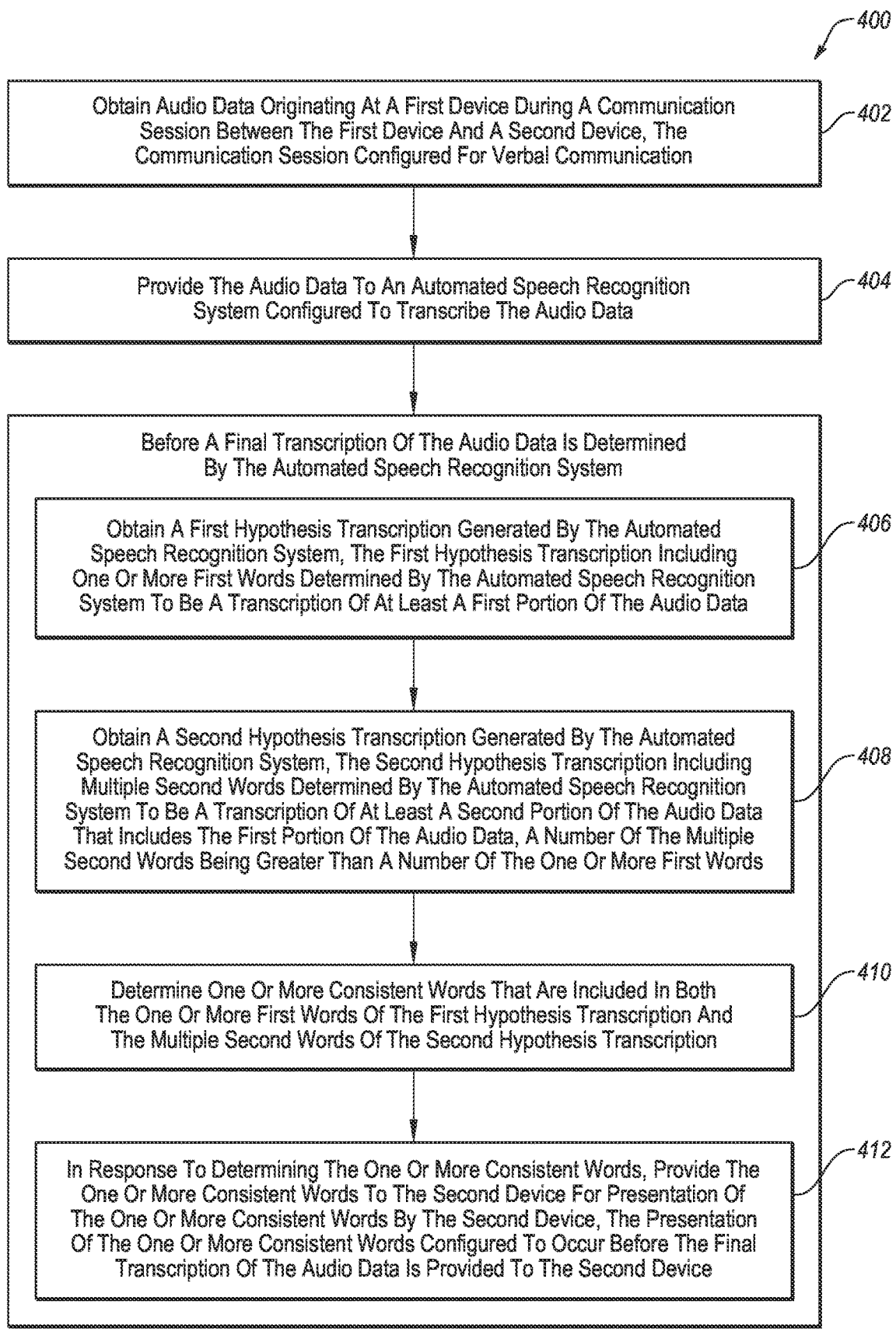
FIG. 4 is a flowchart of an example method to transcribe communications.

FIG. 4 is a flowchart of an example method 400 to transcribe communications. The method 400 may be arranged in accordance with at least one embodiment described in the present disclosure. The method 400 may be performed, in some embodiments, by a device or system, such as the transcription system 130 of FIG. 1 or the computing system 300 of FIG. 3, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where audio data originating at a first device during a communication session between the first device and a second device may be obtained. The communication session may be configured for verbal communication. In some embodiments, the audio data may be a portion of total audio data originating at the first device during the communication session.

At block 404, the audio data may be provided to an automated speech recognition system configured to transcribe the audio data. In some embodiments, before a final transcription of the audio data is determined by the automated speech recognition system, the method may include blocks 406, 408, 410, and 412.

At block 406, a first hypothesis transcription generated by the automated speech recognition system may be obtained. In these and other embodiments, the first hypothesis transcription may include one or more first words determined by the automated speech recognition system to be a transcription of at least a first portion of the audio data.

At block 408, a second hypothesis transcription generated by the automated speech recognition system may be obtained. In these and other embodiments, the second hypothesis transcription may include multiple second words determined by the automated speech recognition system to be a transcription of at least a second portion of the audio data that includes the first portion of the audio data. In these and other embodiments, a number of the multiple second words may be greater than a number of the one or more first words. In some embodiments, the first hypothesis transcription and the second hypothesis transcription may not be provided to the second device.

At block 410, one or more consistent words that are included in both the one or more first words of the first hypothesis transcription and the multiple second words of the second hypothesis transcription may be determined.

At block 412, in response to determining the one or more consistent words, the one or more consistent words may be provided to the second device for presentation of the one or more consistent words by the second device. In these and other embodiments, the presentation of the one or more consistent words may be configured to occur before the final transcription of the audio data is provided to the second device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include obtaining a third hypothesis transcription generated by the automated speech recognition system. In these and other embodiments, the third hypothesis transcription may include multiple third words determined by the automated speech recognition system to be a transcription of at least a third portion of the audio data that includes the first portion and the second portion of the audio data. In these and other embodiments, a number of the multiple third words may be greater than a number of the multiple second words.

In these and other embodiments, the method 400 may further include determining one or more second consistent words that are included in both the multiple second words of the second hypothesis transcription and the multiple third words of the third hypothesis transcription. In these and other embodiments, in response to determining the one or more second consistent words, the method 400 may further include providing the one or more second consistent words to the second device for presentation of the one or more consistent words by the second device. In these and other embodiments, the presentation of the one or more consistent words may be configured to occur before the final transcription of the audio data is provided to the second device.

In some embodiments, the method 400 may further include obtaining the final transcription of the audio data. In these and other embodiments, the final transcription may include multiple third words that the automated speech recognition system outputs together as the finalized transcription of the audio data. In these and other embodiments, the method 400 may further include determining when a portion of the final transcription that corresponds to the one or more consistent words includes an update word that is different from any of the one or more consistent words and in response to determining the update word, providing an indication of the update word to the second device such that the second device changes the presentation of the one or more consistent words to include the update word.

Figure 5:
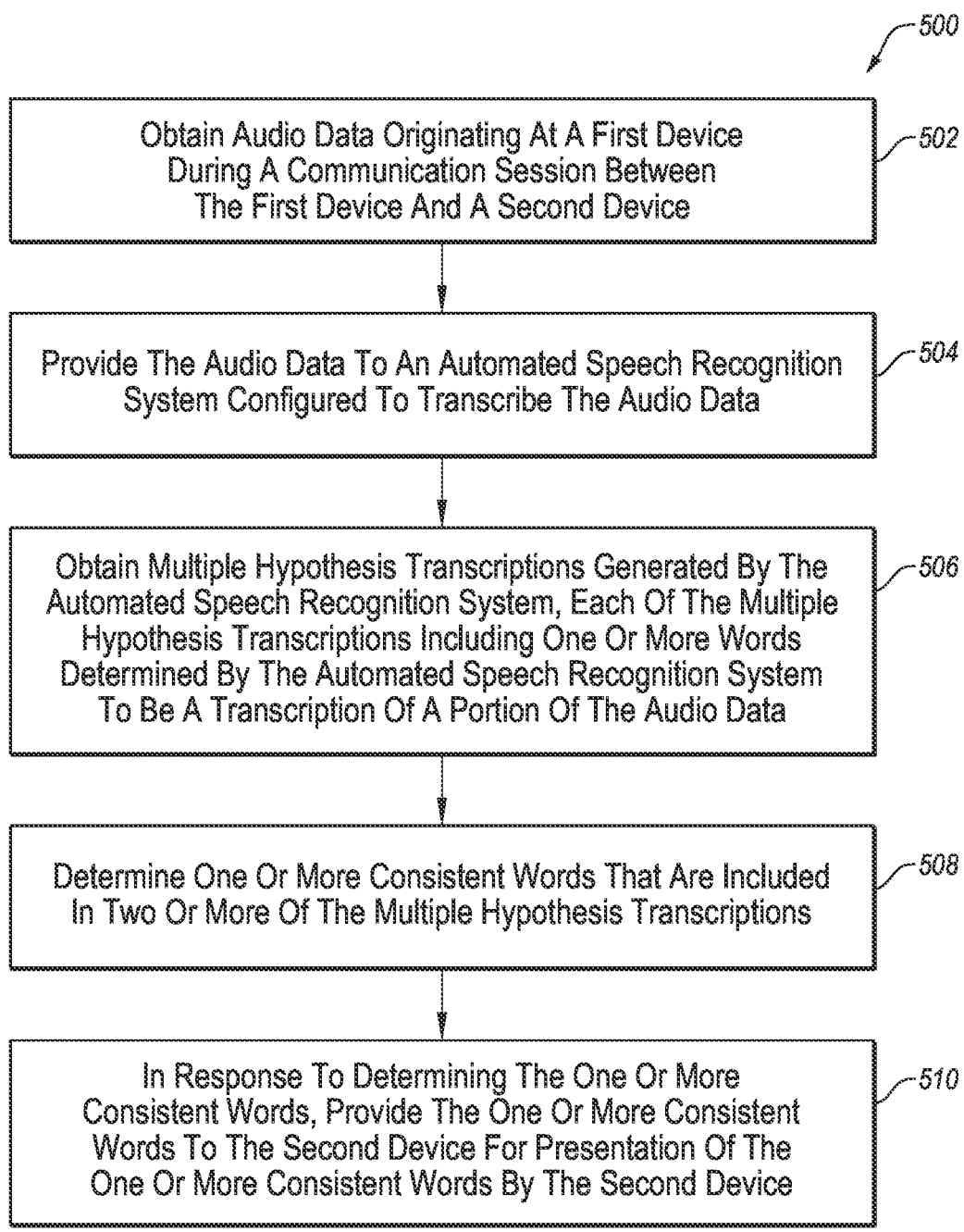
FIG. 5 is a flowchart of another example method to transcribe communications.

FIG. 5 is a flowchart of another example method 500 to transcribe communications. The method 500 may be arranged in accordance with at least one embodiment described in the present disclosure. The method 500 may be performed, in some embodiments, by a device or system, such as the transcription system 130 of FIG. 1 or the computing system 300 of FIG. 3, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where audio data originating at a first device during a communication session between the first device and a second device may be obtained. At block 504, the audio data may be provided to an automated speech recognition system configured to transcribe the audio data.

At block 506, multiple hypothesis transcriptions generated by the automated speech recognition system may be obtained. In these and other embodiments, each of the multiple hypothesis transcriptions may include one or more words determined by the automated speech recognition system to be a transcription of a portion of the audio data. In some embodiments, the multiple hypothesis transcriptions may not be provided to the second device.

In some embodiments, the multiple hypothesis transcriptions are obtained sequentially over time. In these and other embodiments, a first portion of the audio data associated with a first one of the multiple hypothesis transcriptions may include all of the audio data associated with all of the multiple hypothesis transcriptions obtained previous to obtaining the first one of the multiple hypothesis transcriptions.

Alternatively or additionally, the determining the one or more consistent words may include comparing a first hypothesis transcription of the multiple hypothesis transcriptions with a second hypothesis transcription of the multiple hypothesis transcriptions. In these and other embodiments, the second hypothesis transcription may directly follow the first hypothesis transcription among the multiple hypothesis transcriptions.

At block 508, one or more consistent words may be determined that are included in two or more of the multiple hypothesis transcriptions. At block 510, in response to determining the one or more consistent words, the one or more consistent words may be provided to the second device for presentation of the one or more consistent words by the second device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include obtaining a second hypothesis transcription generated by the automated speech recognition system after generation of the multiple hypothesis transcriptions. In these and other embodiments, the second hypothesis transcription may include multiple second words determined by the automated speech recognition system to be a transcription of at least a second portion of the audio data. In these and other embodiments, the method 500 may further include determining one or more second consistent words that are included in both the multiple second words of the second hypothesis transcription and the one or more words of one of the multiple hypothesis transcriptions. In these and other embodiments, in response to determining the one or more second consistent words, the method 500 may include providing the one or more second consistent words to the second device for presentation of the one or more second consistent words by the second device.

In some embodiments, the method 500 may further include obtaining a final transcription of the audio data. In these and other embodiments, the final transcription may include multiple words that the automated speech recognition system outputs together as the final transcription of the audio data. In these and other embodiments, the method 500 may further include determining when a portion of the final transcription that corresponds to the one or more consistent words includes an update word that is different from any of the one or more consistent words. In these and other embodiments, in response to determining the update word, the method 500 may further include providing an indication of the update word to the second device such that the second device changes the presentation of the one or more consistent words to include the update word.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method to transcribe communications, the method comprising:
    obtaining a plurality of hypothesis transcriptions of audio data;
    determining a plurality of consistent words that are included in two or more of the plurality of hypothesis transcriptions;
    in response to determining the plurality of consistent words, directing the plurality of consistent words to a device for presentation of the plurality of consistent words; and
    presenting the plurality of consistent words in a rolling fashion, a pace of the presentation of the plurality of consistent words in the rolling fashion being variable such that when more words are to be presented the words are presented quicker than when fewer words are to be presented.

2. The method of claim 1, further comprising:
    determining an update word in a final transcription of the audio data that is different from any of the plurality of consistent words; and
    in response to determining the update word, directing an indication of the update word to the device, the update word replacing one or more of the plurality of consistent words in the presentation of the plurality of consistent words.

3. The method of claim 1, wherein the presentation of the plurality of consistent words by the device is configured to occur before a final transcription of the audio data is provided to the device.

4. The method of claim 1, wherein the plurality of hypothesis transcriptions are obtained from a speech recognition system that includes a plurality of speech engines configured to recognize speech.

5. At least one non-transitory computer-readable media configured to store one or more instructions that when executed by at least one processor cause or direct a system to perform the method of claim 1.

6. A method to transcribe communications, the method comprising:
    obtaining a plurality of hypothesis transcriptions of audio data;
    determining one or more consistent words that are included in two or more of the plurality of hypothesis transcriptions;
    in response to determining the one or more consistent words, directing the one or more consistent words to a device for presentation of the one or more consistent words;
    determining an update word in a final transcription of the audio data that is different from any of the one or more consistent words; and
    in response to determining the update word and after directing the one or more consistent words to the device, directing an indication of the update word to the device, the update word replacing one or more of the one or more consistent words in the presentation of the one or more consistent words on the device.

7. The method of claim 6, further comprising obtaining the audio data during a communication session between a second device and the device, the audio data originating at the second device.

8. The method of claim 6, wherein the presentation of the one or more consistent words by the device is configured to occur before the final transcription of the audio data is provided to the device.

9. The method of claim 6, wherein the one or more consistent words are presented in a rolling fashion, a pace of the presentation of the one or more consistent words in the rolling fashion being variable.

10. The method of claim 6, wherein the plurality of hypothesis transcriptions are obtained sequentially over time and determining the one or more consistent words includes comparing a first hypothesis transcription of the plurality of hypothesis transcriptions with a second hypothesis transcription of the plurality of hypothesis transcriptions, the second hypothesis transcription directly following the first hypothesis transcription among the plurality of hypothesis transcriptions.

11. The method of claim 6, wherein the plurality of hypothesis transcriptions are obtained from a speech recognition system that includes a plurality of speech engines configured to recognize speech.

12. At least one non-transitory computer-readable media configured to store one or more instructions that when executed by at least one processor cause or direct a system to perform the method of claim 6.

13. A method to transcribe communications, the method comprising: obtaining a plurality of hypothesis transcriptions of audio data, each of the plurality of hypothesis transcriptions including one or more words determined to be a transcription of portions of the audio data;
  determining one or more consistent words that are included in two or more of the plurality of hypothesis transcriptions, each of the two or more of the plurality of hypothesis transcriptions including words from a first portion of the audio data;
  in response to determining the one or more consistent words, providing the one or more consistent words to a device for presentation of the one or more consistent words by the device, the presentation of the one or more consistent words configured to occur before a final transcription of the audio data is provided to the device; and
  presenting the one or more consistent words in a rolling fashion, a pace of the presentation of the one or more consistent words in the rolling fashion being variable such that when more words are to be presented the words are presented quicker than when fewer words are to be presented.

14. The method of claim 13, wherein the plurality of hypothesis transcriptions are obtained from a speech recognition system that includes a plurality of speech engines configured to recognize speech.

15. The method of claim 13, wherein the plurality of hypothesis transcriptions are obtained from a speech recognition system that includes a single speech engine configured to recognize speech.

16. The method of claim 13, wherein a first portion of the audio data associated with a first one of the plurality of hypothesis transcriptions includes all of the audio data associated with at least one of the plurality of hypothesis transcriptions obtained previous to obtaining the first one of the plurality of hypothesis transcriptions.

17. The method of claim 13, wherein the plurality of hypothesis transcriptions are obtained sequentially over time and the determining the one or more consistent words includes comparing a first hypothesis transcription of the plurality of hypothesis transcriptions with a second hypothesis transcription of the plurality of hypothesis transcriptions, the second hypothesis transcription directly following the first hypothesis transcription among the plurality of hypothesis transcriptions.

18. The method of claim 13, further comprising:
  determining an update word in the final transcription that is different from any of the one or more consistent words; and
  in response to determining the update word and after directing the one or more consistent words to the device, directing an indication of the update word to the device, the update word replacing one or more of the one or more consistent words in the presentation of the one or more consistent words on the device.

19. At least one non-transitory computer-readable media configured to store one or more instructions that when executed by at least one processor cause or direct a system to perform the method of claim 13.

\* \* \* \* \*